(12) United States Patent
Jokinen et al.

(10) Patent No.: US 11,298,981 B2
(45) Date of Patent: Apr. 12, 2022

(54) TREAD BLOCK ARRANGEMENT HAVING A SUPPORTING SIPE

(71) Applicant: Nokian Renkaat Oyj, Nokia (FI)

(72) Inventors: Mikko Jokinen, Tampere (FI); Teemu Venäläinen, Tampere (FI)

(73) Assignee: Nokian Renkaat Oyj, Nokia (FI)

( * ) Notice: Subject to any disclaimer, the term of this patent is extended or adjusted under 35 U.S.C. 154(b) by 123 days.

(21) Appl. No.: 16/276,683

(22) Filed: Feb. 15, 2019

(65) Prior Publication Data

US 2019/0248188 A1 Aug. 15, 2019

(30) Foreign Application Priority Data

Feb. 15, 2018 (EP) ..................................... 18397506

(51) Int. Cl.
*B60C 11/03* (2006.01)
*B60C 11/12* (2006.01)
*B60C 11/11* (2006.01)

(52) U.S. Cl.
CPC ...... *B60C 11/0304* (2013.01); *B60C 11/0306* (2013.01); *B60C 11/11* (2013.01);
(Continued)

(58) Field of Classification Search
CPC . B60C 11/0306; B60C 11/11; B60C 11/1204; B60C 11/1236; B60C 11/1263;
(Continued)

(56) References Cited

U.S. PATENT DOCUMENTS 6,527,023 B1  3/2003 Takahashi
7,900,669 B2 * 3/2011 Eromaki ................. B60C 11/12
                                              152/210

(Continued)

FOREIGN PATENT DOCUMENTS

JP   H04266504 A   9/1992
JP   2016168966 A  9/2016

OTHER PUBLICATIONS

Search report of the EP application No. 18397506.9 dated Jun. 4, 2018 by the European Patent Office, pp. 12.

*Primary Examiner* — Matthew J Daniels
*Assistant Examiner* — Shibin Liang
(74) *Attorney, Agent, or Firm* — Merchant & Gould P.C.

(57) ABSTRACT

The invention relates to a tread block arrangement of a tread band or a tire. The tread block arrangement forms a tread that is meant for a rolling contact against a ground surface, wherein the tread is provided with at least one longitudinal groove. The tread block arrangement limits a first number (NT) of sipes, of which a second number (NTT) are transversal sipes of which a third number (N) of sipes form a group. For each sipe of the group, the tread block arrangement forms a bottom a first sidewall, a second sidewall, and a first end wall. The end first end wall of each sipe of the group is configured such that a distance between the first end wall of the sipe in question and an outer side of the pneumatic tire or the tread band is less than a distance between the other end of the sipe in question and the outer side. Moreover, at least a part of the first end wall of the sipe in question has a first surface normal of the sipe in question, and the first surface normal of the sipe in question forms a first angle of the sipe in question of at least 20 degrees with the tread. Furthermore, the ratio (NTT/NT) of the second number (NTT) to the first number (N) is at least 75% and the ratio (N/NTT) of the third number (N) to the second number (NTT) is at least 20%.

26 Claims, 8 Drawing Sheets

(52) U.S. Cl.
CPC ...... *B60C 11/1204* (2013.01); *B60C 11/1236* (2013.01); *B60C 11/1263* (2013.01); *B60C 2011/1213* (2013.01); *B60C 2011/1254* (2013.01)

(58) Field of Classification Search
CPC ..... B60C 2011/1213; B60C 2011/1254; B60C 11/0304
See application file for complete search history.

(56) References Cited

U.S. PATENT DOCUMENTS

| | | | | |
|---|---|---|---|---|
| 8,499,805 | B2* | 8/2013 | Maesaka | C08K 3/30 |
| | | | | 152/209.1 |
| 9,108,472 | B2* | 8/2015 | Hamanaka | B60C 9/20 |
| 2012/0090749 | A1* | 4/2012 | Ohashi | B60C 11/1218 |
| | | | | 152/209.18 |
| 2015/0290981 | A1* | 10/2015 | Berger | B60C 13/001 |
| | | | | 152/523 |
| 2017/0136830 | A1* | 5/2017 | Kuwano | B60C 11/11 |

* cited by examiner

TREAD BLOCK ARRANGEMENT HAVING A SUPPORTING SIPE

PRIORITY

This application claims priority of EP Patent Application No. 18397506.9, filed on 15 Feb. 2018, the content of which is incorporated herein by reference.

TECHNICAL FIELD

The invention relates to pneumatic tires. The invention relates to tread bands used for a tread of a pneumatic tire. The invention relates to tires and tread bands having a tread block arrangement that limits sipes.

BACKGROUND

In the art of pneumatic tires, it is known to provide a tread of a tire with sipes, which, in effect, make the tread softer than a corresponding tread without sipes would be. In this way, sipes increase friction between the tread and the road. Typically the sipes are provided in an axial direction to ease deformation of the tire material in particular when breaking and/or accelerating, thereby improving friction in particular in the forward and backward directions. However, the sipe configuration is typically not optimized for other types of loading.

SUMMARY

To improve the grip of a tire also when driving on a curve of a road, a new sipe configuration for a tire or a tread band is disclosed. The sipes are provided in tread blocks, i.e. in an arrangement of tread blocks. A corresponding tread block arrangement is disclosed in claim 1. A corresponding tire is in disclosed in claim 2.

DETAILED DESCRIPTION

In this description, the following terms are used:

a tread of a tire refers to that part of a surface of a tire which is meant for a rolling contact against a ground surface when the tire is in use.

a tread of a tread band refers to a surface of a tread band. When applied onto a tire, the tread of the tread band forms the tread of the tire.

a tread block refers to a raised portion of rubber that makes up part of the tread.

a tread block arrangement refers to an arrangement of multiple tread blocks, of which surfaces form the tread or a part of a tread. Tread block arrangement can be part of a tire or part of a tread band.

a sipe refers to a small slit (or groove) in the tread. A sipe is limited by only one tread block. Also other sipes may be limited by the same tread block. A width of a sipe, which is less than a length of the sipe, is typically less than 2 mm, such as from 0.1 mm to 1 mm. The length of the sipe, which remains in a longitudinal direction of the sipe, which is perpendicular to the width and perpendicular to the depth of the sipe, is typically at least 5 mm. A depth of a sipe may be at least 4 mm. These measures may apply to each sipe. Conversely, other types of holes are not necessarily regarded as sipes.

a groove refers to a large groove in the tread. A groove is left in between two tread blocks. A width of such a groove is typically more than 2 mm, such as from 3 mm to 10 mm.

a contact patch (of a tire) refers to the portion of a vehicle's tire that is in actual contact with the road surface while driving. The contact patch may depend on driving conditions (e.g. driving straight, driving curved, breaking, tire pressure, etc.). Correspondingly, the contact patches (of each tire) are the only connections between the road and the vehicle. The term footprint is used interchangeably with the term contact patch.

In the art of tires, especially pneumatic tires, it is known to provide a tread of a tire with sipes, which, in effect, make the tread softer than a corresponding tread without sipes would be. In this way, sipes increase friction between the tread and the road, in particular in winter tires. However, in some cases, the sipes may make the tread block too soft in terms of handling the vehicle while driving. In particular, when driving to a curve, the tread and the tread blocks should be sufficiently stiff in order to have good handling also in such a situation.

When driving on a curve of a road, the tread of the tire should transfer transversal support force of the tread to the vehicle. Due to centrifugal forces, this transversal support force may be greater on the outer side of the tire, the outer side referring to the side of the tire that is further away from the centre of the vehicle than an inner side, the outer side being also located on the outer side of the curve of the road, i.e. away from the centre of the osculating circle of the curve of the road. Thus, when driving on a curve, the forces on the tread act also in a transversal direction ST (FIG. 1*b*), the transversal direction ST being parallel to the direction of axis of rotation AX of the tire.

Figure 6A:
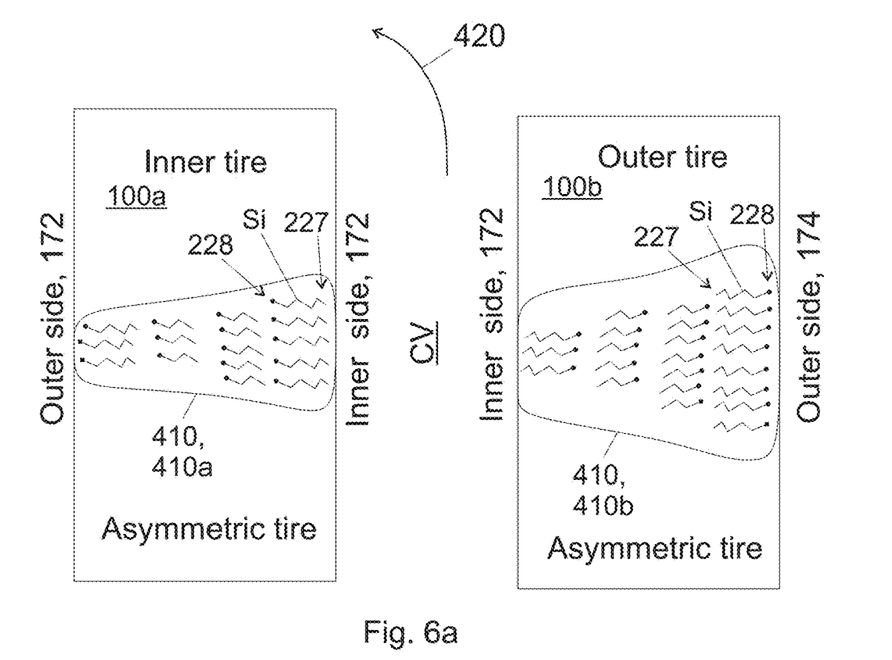
FIG. 6*a* shows, as seen from bottom, two asymmetric tires with sipes.
Figure 6B:
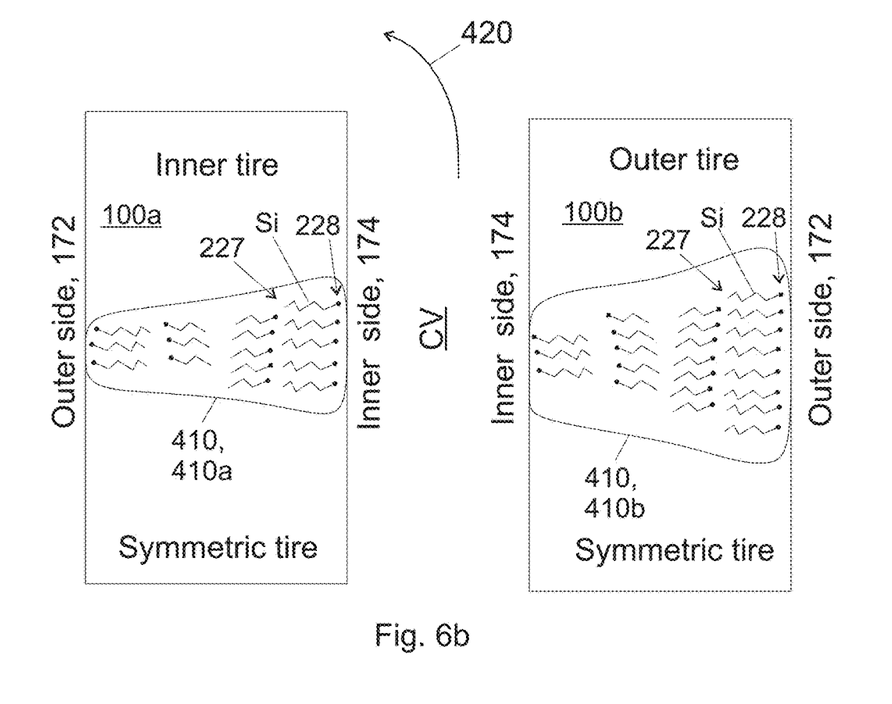
FIG. 6*b* shows, as seen from bottom, two symmetric tires with sipes.

To illustrate this issue further, FIGS. 6*a* and 6*b* show the contact patch 410 of a pair of tires (e.g. front tires) when driving on a curve of a road. As illustrated by the arrow 420, the road extends forward (to top of the page) and curves to left. An inner tire 100*a* is arranged towards the centre of the osculating circle of the curve of the road. Correspondingly, an outer tire 100*b* is arranged away from the centre of the osculating circle of the curve of the road. A longitudinal central axis CV of the vehicle is left in between the inner tire and outer tire. The road itself is typically substantially horizontal, whereby the centrifugal force acting on the vehicle causes a torque in such a way that the outer tire(s) 100*b* are loaded more heavily than the inner tire(s) 100*a*. Therefore, the contact patch 410*b* of the outer tire 100*b* is larger than the contact patch 410*a* of the inner tire 110*a*. Furthermore, the contact patches 410, 410*a*, 410*b* are asymmetric in such a way that, in the circumferential direction, the contact patch is longer near the outer side (the term "outer side" referring to outer relative to the curve of the road) of the outer or inner tire than near the inner side of the outer or inner tire, respectively; as depicted in FIGS. 6*a* and 6*b*. It is also noted that the higher driving speed, the more there is imbalance between the sizes of the contact patches of the inner tire and the outer tire. FIGS. 6*a* and 6*b* indicate orientation of the sipes Si of the tire. As will be discussed, in the present invention at least some of the sipes Si of the tire comprise an inclined first end wall 228. In FIGS. 6*a* and 6*b* the inclined first end wall 228 is denoted by a dot at an end of the sipe Si. The first end wall 228 is configured to support the sipe Si, while the other end 227 may be formed differently.

As indicated in FIG. 6*a*, in case of an asymmetric tire (i.e. an Outside/Inside tire), the sipes Si of the outer tire 100*b* are oriented so that an inclined first end wall 228 of the sipe is configured to support the sipe Si from the right side, which is an outer side when the road curves to left. Correspondingly, none of the sipes Si of the inner tire 100*a* are oriented in that way. However, in particular the outer tire 100*b* is responsible for grip, as indicated above. Correspondingly, all the sipes of the tire 100*a* of the FIG. 6*a* have the first end 228 to the left side, which, if the road would curve to the right, would be an outer side.

As indicated in FIG. 6*b*, in case of a symmetric tire (i.e. a tire having a defined direction of rotation), the sipes Si of the outer tire that are located near the outer side of the tire are oriented so that an inclined first end wall 228 of the sipe is configured to support the sipe Si. Correspondingly, the sipes Si of the outer tire that are located near the inner side of the tire are not oriented that way. However, as indicated by the asymmetrical contact patch 410*b*, the part of the tire 100*b* close to the outer side is mainly responsible for grip. Moreover, the sipes Si of the inner tire 100*a* that are located near the inner side of the tire are also oriented in this manner, whereby also these sipes improve the grip. A corresponding effect can be seen also when the road would turn to right.

It has been found that such forces cause prior art sipes to deform in a manner they are not designed to deform. For example, such forces may open up sipes, whereby the sipe walls no not lock to each other in a designed manner.

To improve the grip provided by the sipes also under such a load, it has been found that a first end wall of the sipe, which is closer to an outer side of the tire than another end of the sipe, can be formed inclined. Having and end wall inclined improves the rigidity of the sipe thereby decreasing the deformation caused by the transversal loading.

This improves the rigidity of that end of the sipe and diminishes the deformation of the sipes due to transversal loading, when driving on a curve. Moreover, at the other end, the sipe may have an open end, or the sipe may be limited by a second end wall. The second end wall may comprise a substantially radial direction so as to provide for suitable softness for the tire in the circumferential direction.

In this way, a sipe, wherein the first end wall 228 is inclined has been observed to improve the grip when driving on a curve. Moreover, when the first end wall 228 and the second end wall 226 are arranged at different angles, the grip is also improved. Such grip is important for tires with a high speed rating, such as speed ratings Q, R, S, T, H, V, W, and Y; i.e. tires designed for driving speeds of at least 106 km/h. Such grip is particularly important for tires with a high speed rating, such as speed ratings S, T, H, V, W, and Y; i.e. tires designed for driving speeds of at least 180 km/h.

In general, a tire (e.g. a pneumatic tire) typically includes either
  a marking indicative of an outside or inside of the tire or
  a marking indicative of the direction of rotation.

However, a tire typically does not include both markings, since then a vehicle should be provided with different types of tires on different side of the vehicle.

The present embodiments are particularly usable for an Outside/Inside tire, which is often called also or alternatively an asymmetrical tire. Such a tire includes a marking indicative of an outside of the tire. Such a marking is, by definition, also indicative of an inside of the tire, since inside is opposite to the outside. In an Outside/Inside tire, when driving on a curve of a road, an outside of an outer tire is always oriented towards on outside of the curve, as indicated in FIG. 6*a*. Thus, a significant part of the sipes can be oriented such that at an end of the sipe close to the outer side of the tire has the support (i.e. an inclining end wall). In an Outside/Inside tire, this can apply on both side of a central line of the tire. Such tires are shown in FIG. 6*a*.

However the present embodiments can be used also in a tire having a determined direction of rotation, which is often called a symmetrical tire. In this case, on both sides of a central line of the tire, a significant part of the sipes can be oriented such that at an end of the sipe closer to the side of the tire than to the central line of the tire has the support (i.e. an inclining end wall). In a symmetrical tire, the sipes on different sides of the central line are thus oriented in different directions, the support being located away from the central line (i.e. further away than the other end of the sipe). Such tires are shown in FIG. 6*b*.

Figure 1A:
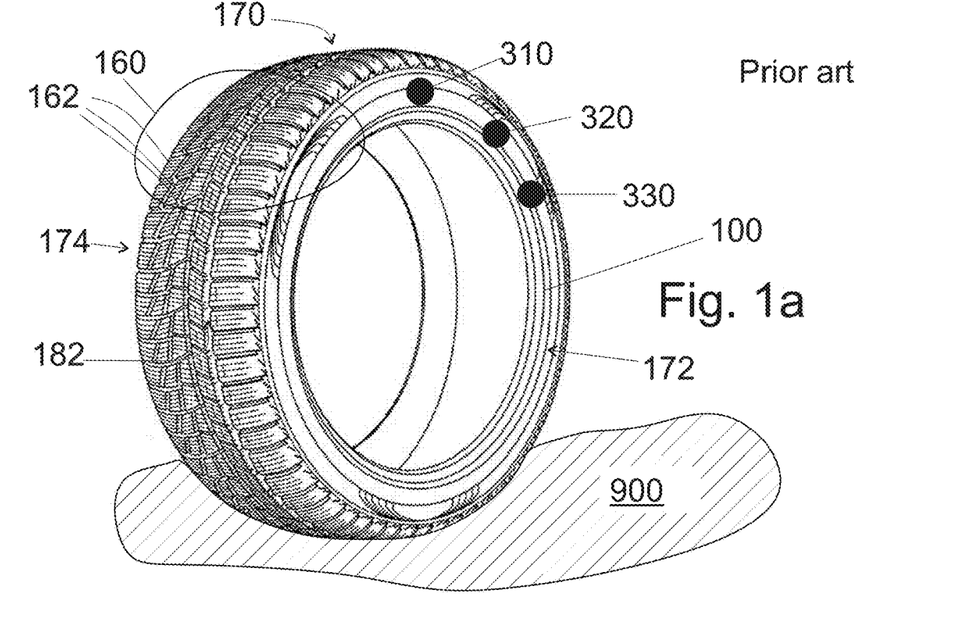
FIG. 1*a* shows a pneumatic tire arranged on a ground surface.
Figure 1B:
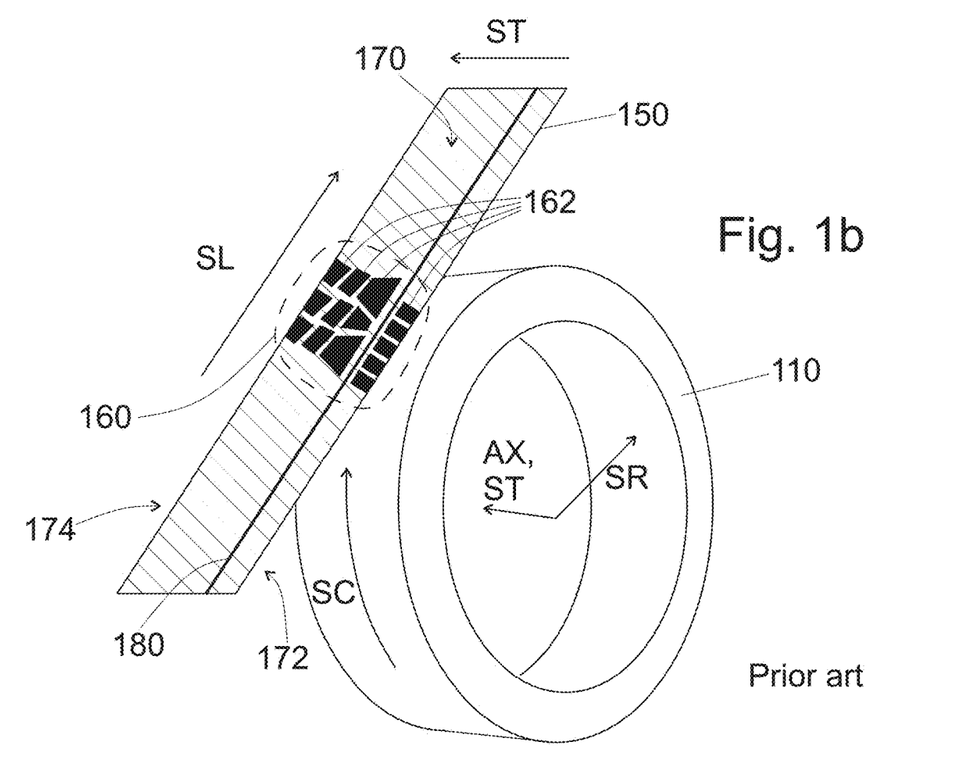
FIG. 1*b* shows application of a tread band onto a cylindrical part of a tire.

FIG. 1*a* shows a tire. Even if FIG. 1*a* shows only features of a prior art tire, such features may be present in embodiments on the present invention. FIG. 1*a* shows a pneumatic tire 100 on a ground surface 900. A part of the outer surface of the tire is called a tread 170 (see above). The tread 170 is meant for a rolling contact against the ground surface 900. The tread 170 is formed of a tread block arrangement 160. More precisely, the tread 170 is formed of outer surfaces of tread blocks 162 of the tread block arrangement 160. Referring to FIGS. 1*a* and 1*b*, such a tread block arrangement may form a part of a tire 100 or a part of a tread band 150.

The tire 100 may be provided with at least one, preferably all of:
  a first marking 310, which
    is indicative of a side that is, in use, configured to form an outer side 172 of the pneumatic tire 100 or
    is indicative of a direction of rotation of the tire
  a second marking 320 indicative of the tire 100 being suitable for use as a winter tire, and
  a third marking 330 indicative of the tire 100 being suitable for driving at a high speed, as detailed below.

Referring to FIG. 1*b*, an untreaded tire, i.e. a cylindrical part 110 of a pneumatic tire 100, may be treaded by applying a tread band 150 onto the cylindrical part 110. The tread band 150 comprises the tread block arrangement 160 for forming a tread 170. The tread band 150 is arranged on the cylindrical part 110 such that the tread 170 of the tread band 150 forms the tread 170 of the pneumatic tire 100. Typically, the tread of the tread band comprises a longitudinal groove 180 arranged in the longitudinal direction SL of the tread band. When applied on the cylindrical part, the longitudinal groove 180 forms a circumferential groove 182 of the pneumatic tire, the circumferential groove 182 of the tire extending in the circumferential direction SC. The transversal direction ST of the tread band is left in between two sides 172, 174 of the tire. The transversal direction is parallel to the direction AX of axis of rotation of the tire 100. A radial direction SR is perpendicular to the circumferential direction SC and the transverse direction ST.

When a tread band 150 is used on a preform 110 for a tire 100, the tread 170 of the tire 100 inherits its shape and properties from the tread band 150. However, it is also possible to manufacture the tire 100 so that the tread 170 and the corresponding thread block arrangement 160 with tread blocks 162 are formed to the tire in a mold. The surface parts of the tire 100 can be considered to form a tread band in the aforementioned sense.

The tread 170 will be disclosed primarily with reference to a tire 100; however, the invention concerns also a corresponding tread block arrangement 160 separate from the tire 100. The tire 100 may be a pneumatic tire 100, which, in use, is inflated.

Referring to FIGS. 1a and 1b, a tire 100 according to an embodiment of the invention comprises a tread block arrangement 160 forming a tread 170 that is meant for a rolling contact against a ground surface 900. The tread block arrangement 160 comprises tread blocks 162. The tread 170 is provided with at least one circumferential groove 182, which is left in between a first side 172 of the tread 170 and a second side 174 of the tread 170. The sides 172, 174 of the tread 170 are defined by the tread blocks 162. The circumferential groove 182 is left in between a first side 172 of the tread 170 and a second side 174 of the tread 170 in a transversal direction. The circumferential groove 182 extends along the tread 170 in a direction transverse to the transversal direction ST. The direction of extension of the longitudinal groove may be a circumferential direction (of a tire) or a longitudinal direction (of the tread band). The transversal direction ST is directed from the first side 172 to the second side 174. It is also noted that the direction that is transverse to the transversal direction ST, i.e. a circumferential direction in case of a tire 100, changes along the surface of the tire 100. However, in case of a tread band 150, the direction that is transverse to the transversal direction ST is a longitudinal direction SL.

Figure 2A:
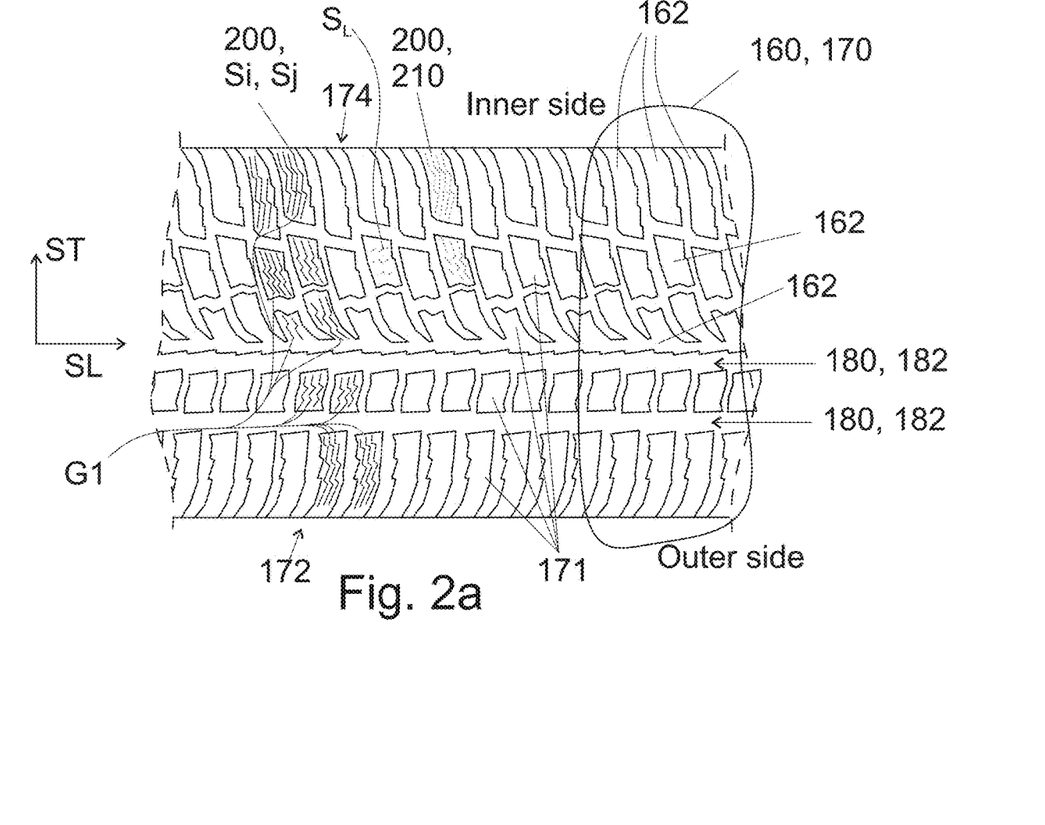
FIG. 2*a* shows, in a top view, a tread of a tread band.

Referring to FIG. 2a, the tread block arrangement 160 limits sipes 200, 210, Si, Sj. The total number of sipes 200 in the tread block arrangement 160 is called a first number NT. In case of a tire, total number of sipes 200 in the tread 170 of the tire 100 is the first number NT. Referring to FIGS. 2a and 2c, the sipes 200 may be longitudinal sipes as denoted by $S_L$ or transversal sipes, as denoted by 200, Si, Sj. Typically most of the sipes are transversal sipes in order to improve grip in particular during accelerating or breaking. A second number NTT of the sipes are transversal sipes. All the sipes may be transversal, whereby the first number NT may equal the second number NTT. Preferably most of the sipes are transversal sipes. This improves the grip in particular during acceleration or breaking. Thus, in an embodiment, the ratio NTT/NT of the second number NTT to the first number NT is at least 75%, preferably at least 90% or at least 95%. In addition, if many longitudinal sipes were provided (i.e. the ratio NTT/NT was low), such longitudinal sipes would take up space from the transversal sipes, thereby worsening the grip.

A transversal sipe refers to a sipe that extends in its longitudinal direction in such a way that the [A] the longitudinal direction of the transversal sipe is parallel with the transversal direction ST of the tread block arrangement or [B] the longitudinal direction of the transversal sipe forms a first angle for the transversal sipe with the transversal direction ST and the first angle for the transversal sipe is at most 45 degrees. Preferably, the longitudinal direction of the transversal sipe forms a first angle for the transversal sipe with the transversal direction and the first angle for the transversal sipe is at most 30 degrees or at most 15 degrees. These magnitudes of the angle (or non-existence thereof) applies to all transversal sipes, even if the tread block arrangement may limit also longitudinal sipes.

Not all sipes 200 need to be equal in shape. In what follows, the aforementioned inventive idea is applicable to a group G1 of sipes. More precisely, the aforementioned inventive idea is applicable to each sipe of the group G1. The group G1 may comprise all of the sipes of the tread, or only part of the sipes. The group G1 may comprise all of the transversal sipes of the tread, or only part of the transversal sipes. The group G1 does not necessarily include only sipes located e.g. at a certain location or close to each other. In this description and figures, the symbols Si and Sj are used to refer to sipes 200 that belong to the group G1, and thereby have a special form, as indicated in detail below. In this description and figures, the reference numeral 210 is used to refer to sipes 200 that have such a shape that they do not belong to the group G1. The reference $S_L$ is used to refer to longitudinal sipes 200; none of the longitudinal sipes belong to the group G1. In other words, the sipes of the group G1 are transversal sipes. Therefore, the number of sipes of the group G1, which is noted by a third number N, is at most the second number NTT.

In FIG. 2a, the sipes Si, Sj of the group G1 are drawn in black colour, while the grey sipes 210 are not part of the group G1. In the alternative, all the sipes may belong to the group G1. The group G1 comprises a first number N of sipes. As is evident from the above, NT≥NTT≥N.

Figure 2B:
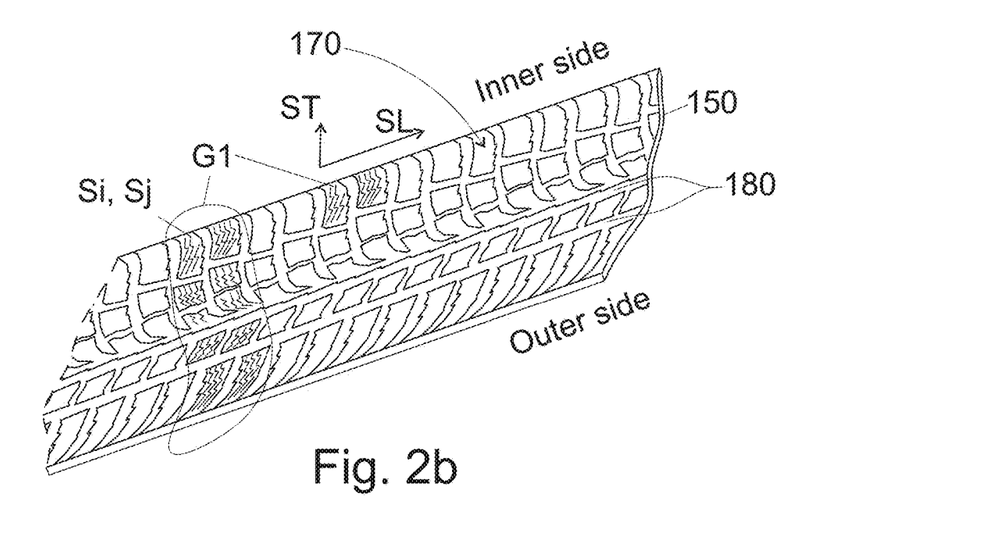
FIG. 2*b* shows, in a perspective view a tread band for forming a tread.
Figure 2C:
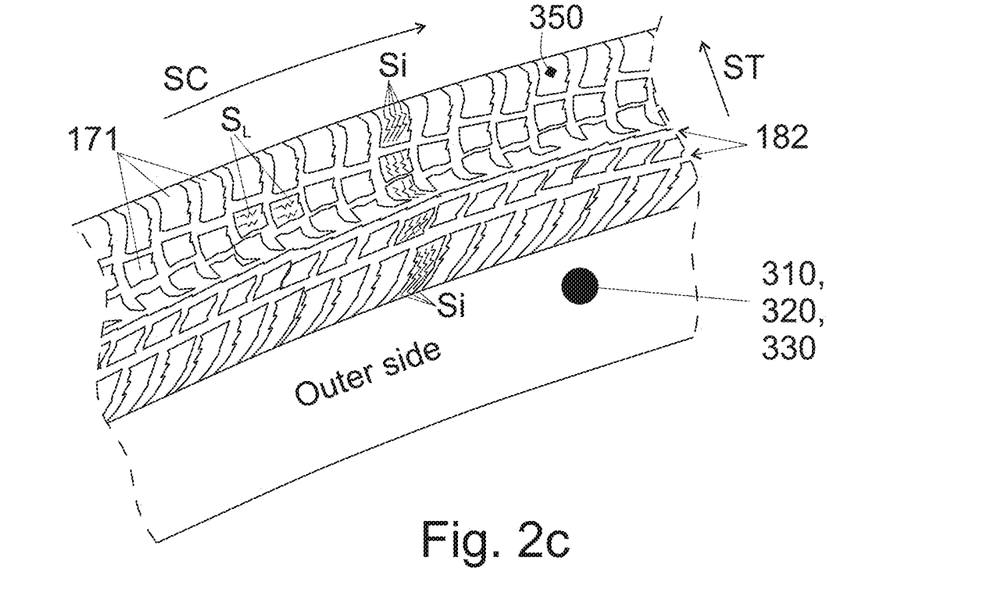
FIG. 2*c* shows, in a perspective view a tread of a tire.
Figure 2D:
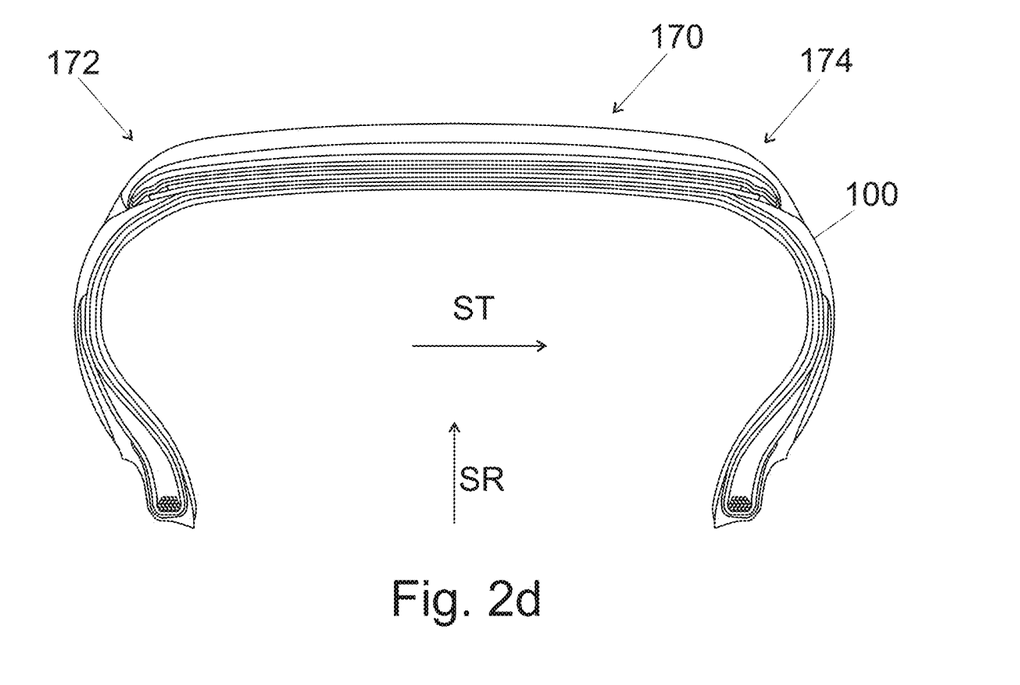
FIG. 2*d* shows half of a cross section of a tire on a cross sectional plane having the axial and radial directions and dividing the tire to two halves.

FIG. 2b shows another possible choice for the group G1. The sipes Si belong to the group G1. As indicated above, the disclosed features are equally applicable to a tire 100 and a tread band 150. FIG. 2c shows the tread band of FIG. 2b having been applied on a cylindrical part 110 of a tire. Thus, FIG. 2c shows a part of a tire. FIG. 2c indicates in more detail, how the tread 170 and the sides 172, 174 are arranged in a tire 100. A sipe 200 that belongs to the group G1 and thus has the desired properties is denoted by Si or Sj. Since multiple sipes Si belong to the group G1, Si may be seen to stand for the i:th sipe (S) of the group G1.

Referring to FIGS. 3a to 3i and 5a to 5c, for each sipe Si of the group G1, the tread block arrangement 160 forms a bottom 221, a first sidewall 222, a second sidewall 224, and a first end wall 228 of the sipe Si in question. As is evident, the first end wall 228 refers to the first end wall $228_{Si}$ of the sipe Si in question. Another sipe Sj from the group G1 has another first end wall $228_{Sj}$. Moreover, a sipe Si extends from the first end wall 228 to another end 227 of the sipe Si. When the sipe Si comprises a second end wall 226, the second end wall 226 defines the other end 227 of the sipe Si. As indicated above, for each sipe Si, only one tread block forms a bottom 221, a first sidewall 222, a second sidewall 224, and a first end wall 228 of the sipe Si in question. Evidently, different sipes may be arranged in different tread blocks.

Figure 3A:
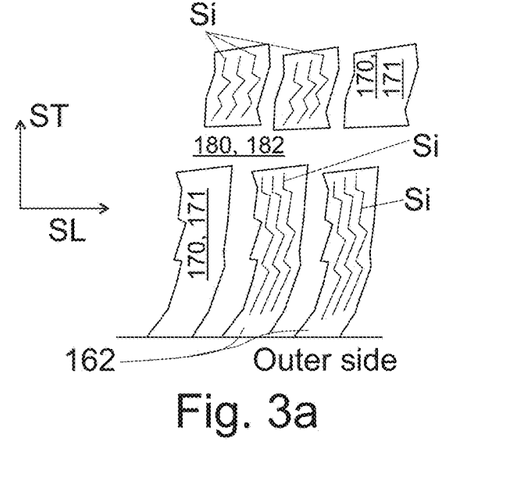
FIG. 3*a* shows, in a top view, tread blocks of a tread, the tread blocks limiting sipes.
Figure 3B:
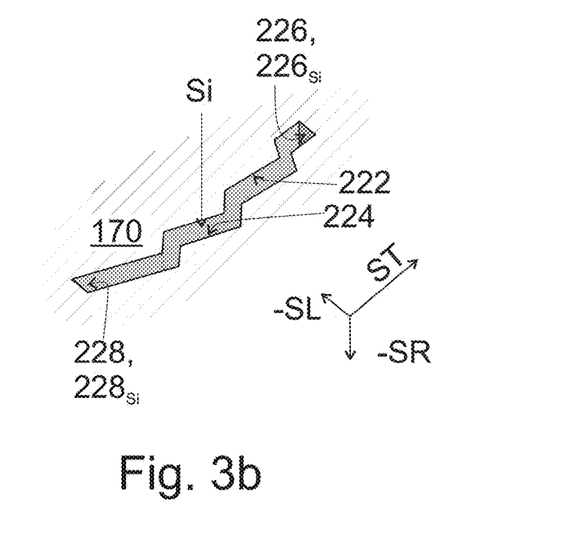
FIGS. 3*b* and 3*c* show, as seen slantwise from top, a sipe.

In addition, the tread block arrangement 160 may form a second end wall 226 for each sipe. As indicated in FIGS. 3a and 3b, a sipe may be limited in between a first end wall 228, which limits a first end of the sipe, and a second end wall 226, which defines the other end 227 of the sipe. However, indicated in FIGS. 5a to 5c, a sipe may be limited from a first end by the first end wall 228. The other end 227 of the sipe may at an intersection of the sipe and a groove 180, 182; or at a side of the tire. Thus, the other end 227 of the sipe may be at an edge of a tread block 162. A groove defining an end 227 of the sipe Si need not to be a circumferential (or longitudinal) groove.

Figure 3C:
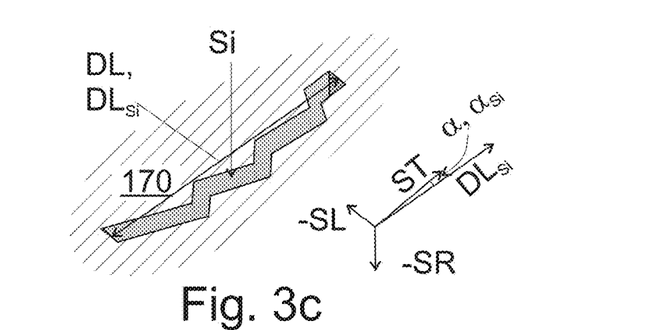

Referring to FIG. 3c, each sipe Si of the group G1 extends in its longitudinal direction DL in between the first end wall 228 of the sipe Si in question (i.e. first end wall $228_{Si}$) and another end $227_{Si}$ of the sipe Si in question. The expression "sipe in question" refers to the sipe Si of which properties are concerned. Thus, the direction DL may also depend on which sipe is in question, and could be denoted by $DL_{Si}$ in order to emphasize that the direction may depend on which one of the sipes of the group G1 is observed. As indicated above, also the sipes of the group G1 are transversal. Thus, for each sipe Si of the group G1 the longitudinal direction DL (or $DL_{Si}$) either [A] is parallel to the transversal direction ST or [B] forms a first angle α or $α_{Si}$ of at most 45 degrees with the transversal direction ST. To adjust the grip provided by the sipes in particular for breaking and/or accelerating, in an embodiment, for each sipe Si of the group G1 the longitudinal direction DL forms a first angle α or $α_{Si}$ of at most 30 degrees or at most 15 degrees with the transversal direction ST.

Moreover, to have the first end wall to support the sipe Si as indicated above, the end first end wall 228 (i.e. $228_{Si}$) of each sipe Si of the group G1 is configured such that a distance $d_{1,Si}$ between the first end wall $228_{Si}$ and an outer side 172, 174 of the tire 100 is less than a distance $d_{2,Si}$ between the other end 227 of the sipe in question and the outer side 172, 174, at least a part of the first end wall $228_{Si}$ has a first surface normal Nisi, and the first surface normal Nisi forms a first minimum angle $β_{Si}$ of at least 20 degrees with the tread 170. Thus, the first surface normal $N1_{Si}$ forms the angle $β_{Si}$ with such a direction of the tread 170 at the location of the first end wall $228_{Si}$ that minimizes the angle between the first surface normal $N1_{Si}$ and the directions of the tread at the location of the first end wall $228_{Si}$.

Moreover, a bottom of a sipe is not an end wall. Therefore, the first surface normal $N1_{Si}$ forms a first minimum angle $β_{Si}$ of at most 85 degrees with the tread 170. These quantities are shown e.g. in FIGS. 3d and 3j.

Here, the outer side refers to the one of the two sides 172, 174 of the tire 100 that is arranged further away from the centre of the vehicle than an opposite side. To this end there are two possibilities. [A] the tire 100 may comprise a first marking 310 indicative of the outer side; or [B] the first end wall 228 is closer to the outer side of the pneumatic tire 100 or the tread band 150 than an opposite other (i.e. inner) side of the pneumatic tire 100 or the tread band 150. Regarding the alternative [B] a distance between the first end wall 228 and the outer side of the pneumatic tire 100 or the tread band 150 is less than a distance between the first end wall 228 and an opposite inner side of the pneumatic tire 100 or the tread band 150.

Figure 5A:
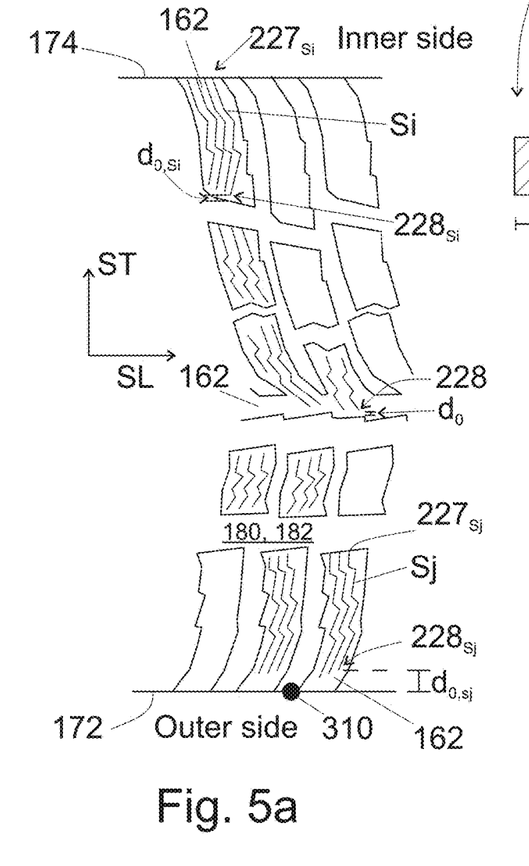
FIG. 5*a* shows, in a top view, tread blocks of a tread, the tread blocks limiting sipes with only one end wall.
Figure 5B:
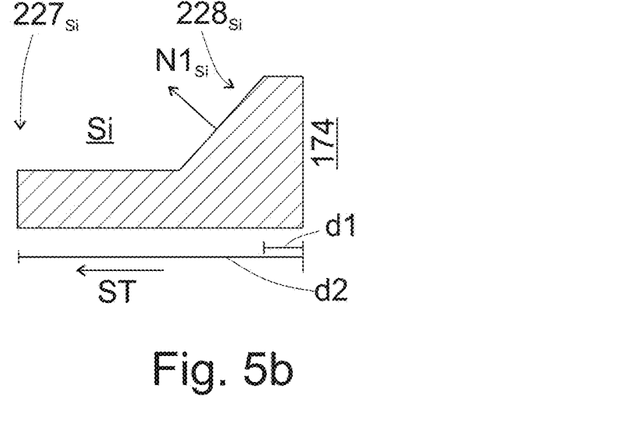
FIGS. 5*b* and 5*c* show an end wall of a sipe.
Figure 5C:
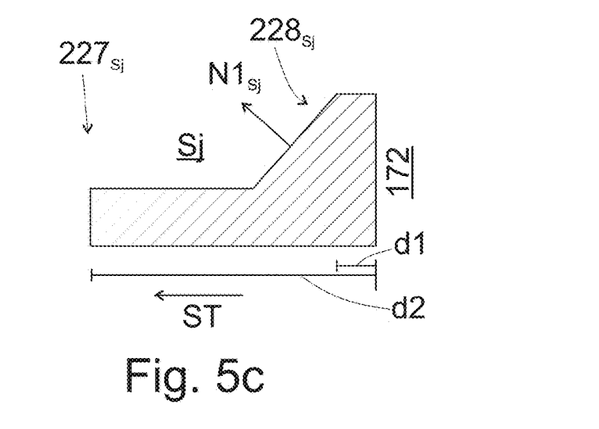

To exemplify these issues, FIGS. 5a to 5c indicate an embodiment, where a marking 310 indicates the outer side. The sipes Si are oriented such that the first end wall 228 is arranged closer to that side (i.e. the outer side) than the other side (i.e. the inner side).

Figures 4A, 4B, 4C:
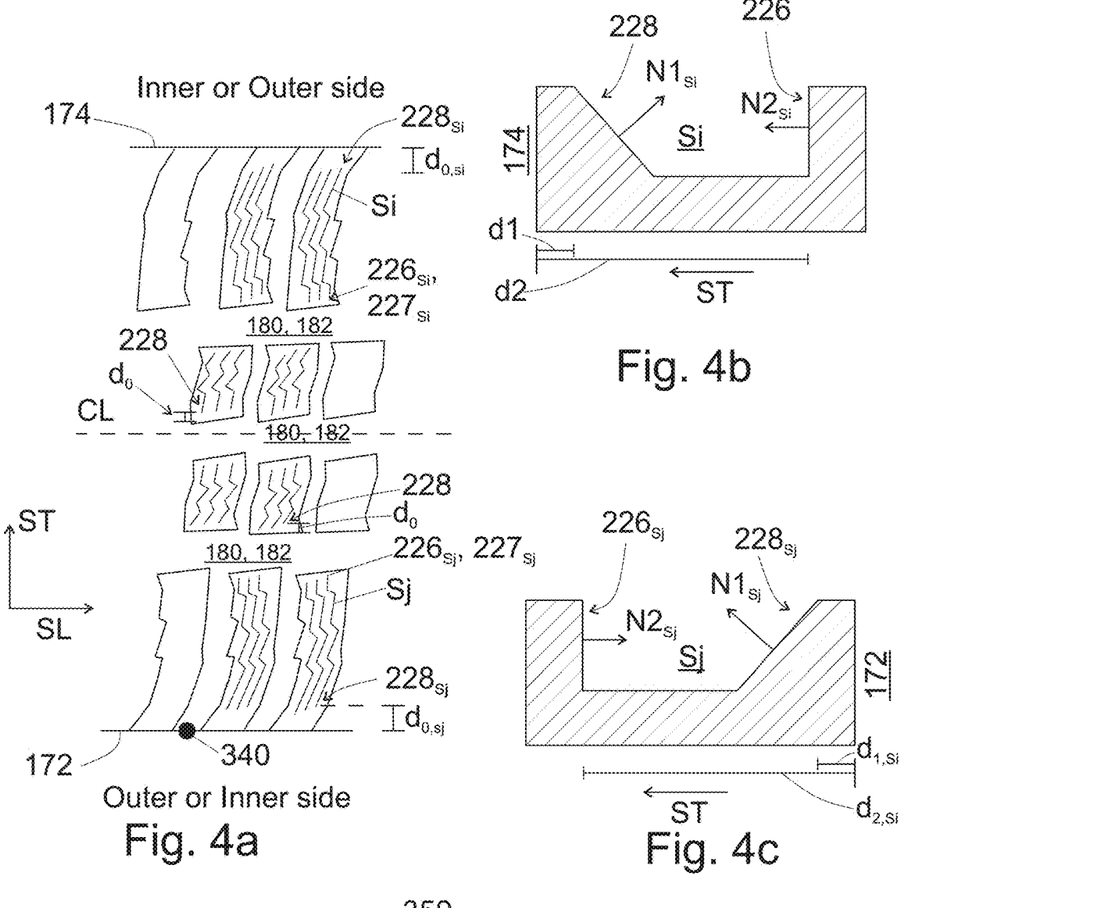
FIG. 4*a* shows, in a top view, tread blocks of a tread, the tread blocks limiting sipes.
FIGS. 4*b* and 4*c* show end walls of a sipe.

On the other hand, FIGS. 4a to 4c indicate an embodiment, where a marking 340 indicates the direction of rotation. The sipes Si are oriented such that the first end wall 228 of the sipe Si is arranged closer to the outer side 172, 174 than the second end 227 of the sipe Si, such as the second end wall 226 of the sipe Si, wherein the first end wall 228 is also arranged closer to the outer side 172, 174 than an opposite inner side 174, 172.

This has the effect that the inclined first end wall 228 is arranged to support the sipe when driving on a curve, as motivated above. Moreover, as indicated in FIGS. 3f to 3i, the first end wall is not necessarily planar. The first end wall 228 may be curved (see FIG. 3f) or it may be formed of two or more planar parts (FIGS. 3g to 3i). Therefore, only at least part of the first end wall has the surface normal indicative of an inclined end wall; as detailed above. In other words, a normal N1 may be defined in various places, and the direction of the normal may depend on its location. Thus also the angle with the tread depends on the location. However, at some point of the end wall, the angle between the normal N1 and the tread at that point is in the aforementioned limits. Thus, as indicated above, the first surface normal $N1_{Si}$ forms a first minimum angle β of at least 20 degrees with the tread 170.

However, in the some embodiments, the whole first end wall 228 has a first surface normal N1 (see FIGS. 3d, 3e, 4b, 4c, 5b, and 5c). In these cases, the first end wall 228 is planar. Moreover, for a proper inclination, first surface normal N1 forms the first minimum angle β with the tread 170. The minimum angle is also expressly written out, since an angle between a direction and a plane is in question. As conventional, to determine the minimum angle, such a direction within the tread is selected that the minimum angle is reached between the surface normal N1 and the tread. Preferably, the sipe is suitably deep and wide, as indicated above. Therefore, preferably the first minimum angle is at most 75 degrees.

In case only a few sipes have a supporting effect, in which case N is small, the whole tread does not have the desired properties, since many of the sipes would be traditional sipes without the supportive end. However, not all the sipes need to have the desired properties, since a few traditional sipes do not significantly affect the properties of the tread. Thus the third number N may be less than the second number NTT. To have a reasonable amount of such sipes wherein the first end wall actually supports the sipe, in an embodiment, the ratio N/NTT of the third number N (i.e. that of the sipes in the group G1) to the second number NTT (of transversal sipes) is at least 20%. Preferably, the ratio N/NTT is at least 30%, at least 40%, at least 50%, at least 65%, at least 80%, or at least 90%. It is naturally possible to provide the tire with only transversal sipes and only such sipes that have the inclined end surface. However, typically a small amount of traditional sipes may be provided to the tire without impairing the present improvement. The supportive effect of the sipes is the better the greater portion of the sipes have the properties as described below.

Referring to FIGS. 5a to 5c, the invention is preferably applied in an Outside/Inside—type tire. An Outside/Inside tire 100 (or the tread band 150 or the tread block arrangement 160) comprises a first marking 310 indicative of a side that is, in use, configured to form an outer side 172 of the pneumatic tire 100 (or the tread band 150 or the tread block arrangement 160), the outer side 172 being located further away from a centre of a vehicle than an opposite inner side 174 of the tire 100 (or the tread band 150). In such a tire, it is always known, which side 172, 174 of the tire is outside. Therefore, in an embodiment, substantially all of the sipes Si with an inclined first end wall may be arranged such that the first end wall is closer to the outer side 172 than the other side 174. Herein the term "substantially all" may refer e.g. to a ratio N/NTT of at least 90% or at least 95%. As indicated above, in the alternative, the tire 100 may be a symmetric tire.

In FIGS. 5a to 5c, the transversal direction ST is oriented from the outer side 172 to the inner side 174; however it could equally well be oriented from the inner side 174 to the outer side 172. As indicated in FIGS. 5a and 5b substantially all the sipes may be arranged such that the first end wall 228 is closer to the outer side 172 than an other end 227 of the sipe. Thus, a distance between the first end wall 228 and the outer side 172 is less than a distance between the second end 227 (e.g. second end wall 226) and the outer side 172.

The sipe extends in the direction DL, directed away from the first end wall 228, and the direction of extension DL forms an angle of at most 45 degrees with such a transversal direction ST that is oriented from the outer side towards the inner side. More precisely, a sipe Si of the group G1 extends in the direction $DL_{Si}$, directed away from the first end wall 228 (to the second end 227 or the second end wall 226 of the sipe Si, whichever applies), and the direction of extension $DL_{Si}$ forms an angle of at most 45 degrees with such a transversal direction ST that is oriented from the outer side towards the inner side. Moreover, another sipe Sj of the group G1 extends in the direction $DL_{Sj}$, directed away from the first end wall 228 (to the second end 227 or the second end wall 226 of the sipe Sj, whichever applies), and the direction of extension $DL_{Sj}$ forms an angle of at most 45 degrees with such a transversal direction ST that is oriented from the outer side towards the inner side. This applies to all sipes Si, Sj of the group G1.

Referring to FIGS. 3a to 3i, what has been said above in the case where the sipes do not comprise a second end wall 266 applies equally well for a tire, such as an Inside/Outside tire, having sipes with also a second end wall 226.

FIGS. 4a to 4c depict a tire, in which the direction of rotation is predetermined. Such a tire (or the tread band 150) comprises a fourth marking 340 indicative of a direction of rotation of the tire 100 (or tread band 150) when in use. In such a tire, either of the sides may be an outer side when in use. However, with reference to FIG. 6b, in such a case, that half of the tire that is on an outer side of the tire as seen from the centre of the tire is mainly responsible for transmission on transverse forces. Therefore, in such a tire, the sipes are preferably oriented such that the first end wall 228 is arranged further away from the central line CL of the tire than the other end 227 of the sipe. Correspondingly, a distance $d_{1,Si}$ between the first end wall $228_{Si}$ of the sipe Si and an outer side (172, 174) of the pneumatic tire 100 (or the tread band 150) is less than a distance $d_{2,Si}$ between the other end $227_{Si}$ of the sipe Si and the outer side (172, 174), wherein the outer side (172, 174) is closer to the first end wall 228 than an opposite other side (174, 172) of the pneumatic tire 100 (or the tread band 150). In other words, a distance between the outer side (172, 174) and the first end wall 228 is less than a distance between an opposite other side (174, 172) of the tire or tread band and the first end wall 228. Thus, as indicated in FIGS. 4a to 4c, the first end wall is arranged, relative to the other end in different directions on different sides of the central line CL.

In what follows, the idea will be explained referring to only to a single sipe Si. It is understood that these features are applicable to each one of the sipes of the group G1. However, the sipes of the group G1 need not to be identical. As an example, as indicated above, e.g. for each sipe Si of the group G1 the longitudinal direction DL forms a first angle α of at most 45 degrees with the transversal direction ST. However, the angle α itself depends on which one of the sipes is in question. Therefore, the directions and angles for the sipe Si in question may be denoted also be $DL_{Si}$ and $α_{Si}$, respectively. The same principle applies also for other features to be discussed, such as an inclination angle of a second end wall; angle between the first and second end walls, etc.

Figure 3D:
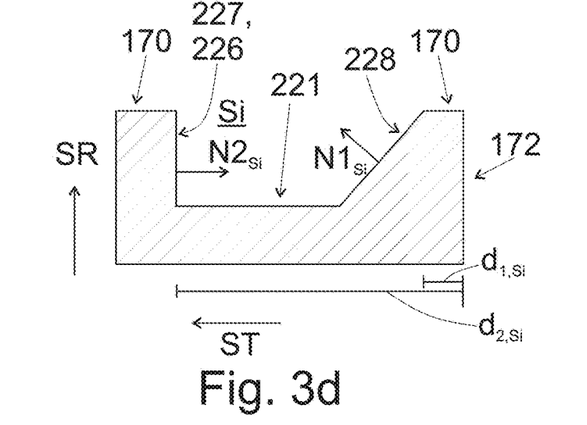
FIGS. 3*d* to 3*i* show end walls of a sipe.
Figure 3E:
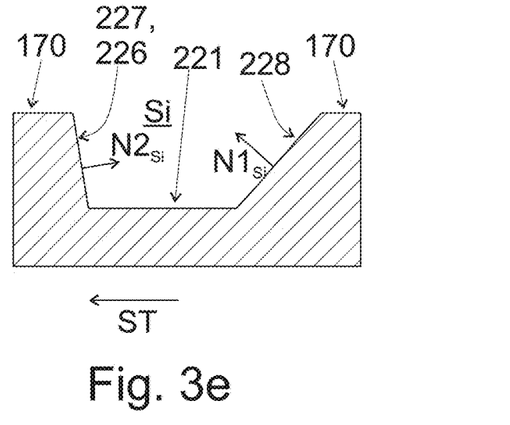
Figure 3F:
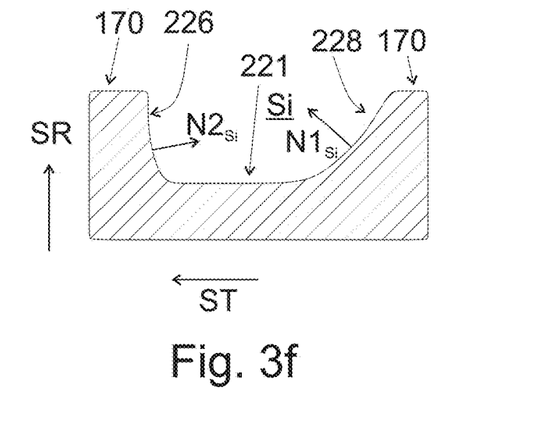
Figure 3G:
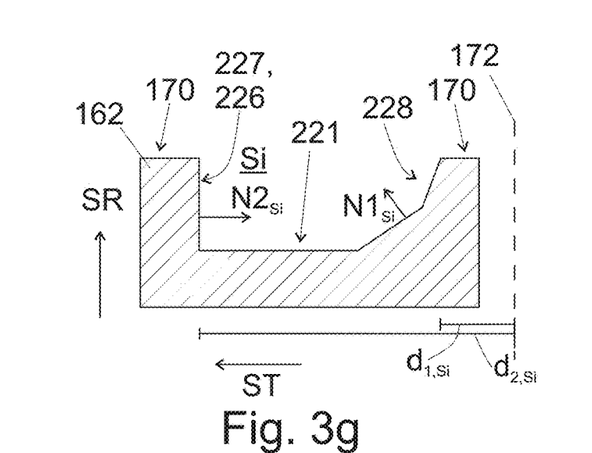
Figure 3H:
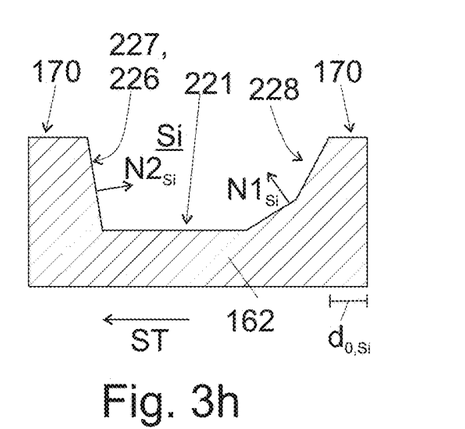
Figure 3I:
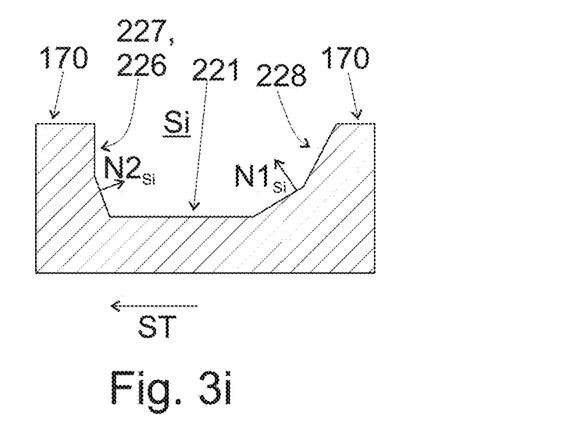

Referring to FIGS. 3a to 3i and 4a to 4c, preferably the sipe Si is limited also by a second end wall 226. A tread block 162 of the tread block arrangement 160 comprises the second end wall 226. The second end wall 226 may be planar, as indicated in FIGS. 3d and 3e, or the second end wall 226 may be non-planar, as indicated in FIGS. 3f and 3i. A non-planar end wall may comprise two or more than two planar parts, as indicated in FIG. 3i. In both cases at least a part of the second end wall 226 has a second surface normal N2. As indicated above, the second surface normal $N2_{Si}$ depends on which one of the sipes Si of the group G1 is observed.

In general, the technical function of a sipe is to ease deformations, in effect softening the tread. To have this function also close to the second end wall 226 it has been found that the second end wall 226 is preferably not as inclined as the first end wall 228. Preferably, the second end 226 wall comprises a substantially radial direction SR (see FIGS. 1b and 3d). This has the effect that the first end wall 228 provides for more support to the tread block limiting the sipe than the second end wall 226. In this way, the supportive effect of the sipe can be engineered to be non-symmetrical, i.e. different depending on whether the forces acting on the footprint are directed from outside to inside or vice versa. Thus, the handling and grip properties can be better optimized.

Thus, preferably, each sipe Si of the group G1 either
is free from the second end wall 226 or
comprises a second end wall 226 that has a different inclination than the first end wall 228.

Concerning the former, such embodiments are depicted in FIGS. 5b and 5c. Concerning the latter, an average inclination of the second end wall 226 may be different from an average inclination of the first end wall 228. For example, the second end wall 226 may form, on the average, a smaller angle with the radial direction of the tire (i.e. the direction of thickness of the tread block arrangement) than the first end wall 228; as depicted in FIGS. 3d to 3i, 4b, and 4c. In this way, preferably the sipe is non-symmetric. The aforementioned "each sipe Si of the group G1" does not refer to all sipes of the group G1. Thus, it is possible that some sipes of the group G1 are free from a second end wall 226 and some other sipes of the group G1 comprise a second end wall 226.

This has the effect that the sipes Si of the group G1 are engineered to support the tread block 162, having the sipe Si, against a transversal load from a particular direction; i.e. from a load directed from the first end wall $228_{Si}$ in the longitudinal direction of the sipe Si.

Figure 3J:
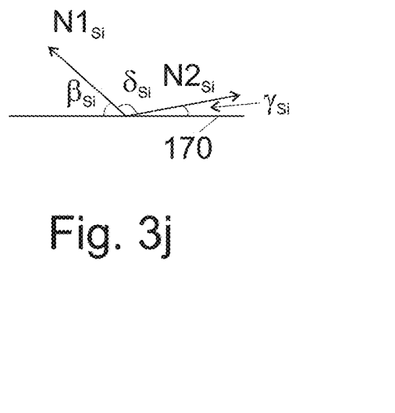
FIG. 3*j* shows angles of the sipe.

In an embodiment, the second surface normal N2 belongs to a plane that is parallel to the tread 170 or forms a second minimum angle γ of at most 15 degrees with the tread 170. In this way, the second end wall 226 may comprise a radial direction or a substantially radial direction. The second minimum angle γ is shown in FIG. 3*j*. It is also noted that the directions of the normal of FIG. 3*j* correspond to the directions shown in FIG. 3*f*. More precisely, for each sipe Si of the first group G1, a second surface normal $N2_{Si}$ of the sipe Si in question belongs to a plane that is parallel to the tread 170 or forms a second minimum angle $\gamma_{Si}$ of at most 15 degrees with the tread 170. The first and/or second and walls 228, 226 need not to be planar, as indicated in FIG. 3*f*. What has been said about a minimum angle between a direction and a plane applies also to the second minimum angle γ or $\gamma_{Si}$. In an embodiment, the second minimum angle γ is at most 5 degrees.

In an embodiment, a second angle δ (or $\delta_{Si}$; see FIG. 3*j*) of from 10 to 170 degrees is left in between the first surface normal N1 and the a second surface normal N2 of the sipe Si. More precisely, in an embodiment, for each sipe Si of the first group G1: [A] the sipe Si is free from the second end wall 226 or [B] a second angle $\delta_{Si}$ (see FIG. 3*j*) of from 10 to 170 degrees, preferably from 45 to 160 degrees, is left in between a first surface normal $N1_{Si}$ of the first end wall 228 and a second surface normal $N2_{Si}$ of the second end wall 226 of the sipe Si. The second angles $\delta_{Si}$ may vary depending on which sipe Si of the group G1 is observed. In an embodiment, each sipe Si of the group G1 comprises the second end wall 226.

Referring to FIGS. 4*a* and 5*a*, in order for the first end wall 228 of the sipe Si, Sj to have a reasonable supportive effect, the first end wall 228 should not be arranged too close to a boundary of that tread block 162 that limits the sipe Si, Sj. In the alternative or in addition, the first angle $\beta_{Si}$ between a normal of the first end wall 228 and the tread may be at least 30 degrees or at least 40 degrees in order to provide for the reasonable supportive effect.

In the former case, a distance $d_{0,Si}$ is left in between the first end wall 228$_{Si}$ of the sipe Si and a closest boundary of the tread block 162 that limits the sipe Si. Moreover, a distance $d_{0,Sj}$ is left in between the first end wall 228$_{Si}$ of the sipe Sj and a closest boundary of the tread block 162 that limits the sipe Sj.

Correspondingly, distances $d_0$ are left in between the first end walls 228 of other sipes and the closest boundaries of the tread blocks that limit the sipes, as indicated in FIGS. 4*a* and 5*a*. In order to have a reasonable support, the the distance do (and $d_{0,Si}$ and $d_{0,Sj}$) may be at least 0.5 mm, at least 1 mm, at least 2 mm or at least 5 mm. More precisely, a distance $d_{0,Si}$ between the first end wall 228 of each sipe Si of the group G1 and a closest edge of a tread block is at least 0.5 mm, at least 1 mm, at least 2 mm or at least 5 mm. Herein the closest edge of a tread block refers to that one of the edges of such a tread block 162 that limits the sipe Si in question that is closest to the first end wall 228$_{Si}$ of the sipe Si in question.

In the alternative or in addition, the first angle $\beta_{Si}$ between a normal of the first end wall 228 and the tread may be at least 30 degrees or at least 40 degrees. More precisely, in an embodiment, for each sipe Si of the group G1, a first angle $\beta_{Si}$ between a normal of the first end wall 228$_{Si}$ of the sipe in question and the tread (at the point of the first end wall 228$_{Si}$ of the sipe in question) is at least 30 degrees or at least 40 degrees Preferably the tread block arrangement 160 is arranged on a tire 100, such as an inflatable pneumatic tire 100. Preferably the tire 100 that comprises the sipes Si is a pneumatic tire 100, such as an inflatable pneumatic tire 100.

Figure 4D:
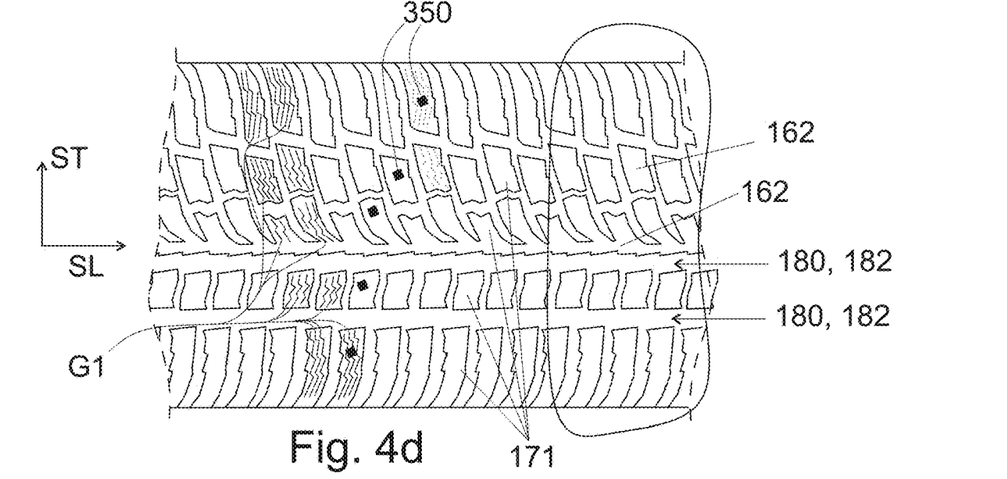
FIG. 4*d* shows, in a top view, tread blocks of a tread, some of the tread blocks provided with studs.

The sipes Si are preferably applied to a winter tire. Thus, in an embodiment, the tire 100 (or the tread band 150 or the tread block arrangement 160) comprises a second marking 320 indicative of the tire 100 or the tread band 150 being suitable for use as a winter tire. The tire or the tread band may comprise studs 350 for improving friction. Some studs 350 are shown in FIG. 4*d*. In general, a stud 350 is provided with a hard metal pin that protrudes from the tread 170. For example, conventional studs for the purpose can be used.

Moreover, winter tires are preferably made of reasonable soft rubber material to further improve grip. Thus, in an embodiment, the tread 170 of the tire 100 (or the tread band 150 or the tread block arrangement 160) is formed of a material comprising rubber having shore A hardness of less than 70 ShA according to ASTM standard D2240, version 15e1. In an embodiment, the tread 170 of the tire 100 (or the tread band 150 or the tread block arrangement 160) is formed of a material consisting of rubber having shore A hardness of less than 70 ShA according to ASTM standard D2240, version 15e1.

As indicated above in connection with FIGS. 6*a* and 6*b*, the sipes are preferably provided to tires for high driving speeds. A high driving speed makes more imbalance between the contact patches of inner and outer tires in addition to imbalance between inner and outer parts of the contact patches. Thus, in an embodiment, the tire 100 (or the tread band 150 or the tread block arrangement 160) comprises a third marking 330 indicative of the tire 100 or the tread band 150 being suitable for driving at a speed of at least 106 km/h, such as at least 180 km/h. Such speed classes are typically implied by a letter, as detailed above.

Sipes 200 in general may be manufactured by using a lamella plate, which is used as a mould for the sipes. A lamella plate for manufacturing the sipe of the embodiments is easy to manufacture, when the part of the lamella plate forming the first end wall 228 is straight. A corresponding, and preferable, first end wall 228 of the sipe Si is planar. Thus, preferably the first end wall 228$_{Si}$ of each one of the sipes Si of the first group G1 is planar. Preferably also the second end wall 226 of the sipe Si is planar. Thus, preferably each one of the sipes Si of the first group G1 comprises a second end wall 226$_{Si}$ that is planar.

As more accurately specified above, the sipe Si extends in between the first end wall 228 and the other end 227 in a substantially transversal direction. This is because the function of the sipe Si is primarily to improve grip during breaking and accelerating. In principle, a sipe could be arbitrarily formed, e.g. star-shaped to have more than two ends. However, in such a case, parts of the sipes would be oriented in to a less preferable orientation. Therefore, preferably, the sipe Si has only two ends. The first end wall 228 defines a first end of the sipe, while the other end 227 may be defined by a second end wall 226 or an edge of a tread block 162. In an embodiment each one of the sipes Si of the group G1 comprises at most two end walls, i.e. has a shape of an unbranched line, optionally zig-zag, when viewed from top. In an embodiment each one of the sipes Si of the group G1 comprises exactly two end walls, i.e. the walls 226 and 228. As indicated above, in addition, the sipe Si comprises a bottom and two side walls 222, 224 (see FIGS. 3*b* and 3*c*).

Preferably the sipe Si extends so as to form a zigzag pattern. This improves grip also in the transversal direction and helps the sidewalls of the sipes to lock to each other under breaking or accelerating. Thus, preferably the sipe Si extends in between the first end wall 228 and the other end 227 such that when viewed from top, the sipe Si has the form of a zigzag. More preferably, each sipe of the group G1 extends in between the first end wall $228_{Si}$ of the sipe Si and the other end $227_{Si}$ (e.g. the second end wall $226_{Si}$) of the sipe Si such that when viewed from top, the sipe Si has the form of a zigzag. A zigzag may have at least two bends. Typically, a zigzag has at least four bends. The bends need not be sharp, i.e. their radius of curvature may be e.g. 1 mm or more. The bends may be sharp. In this case, each bend forms an inner corner. Such an inner corner is sharp, i.e. its radius of curvature may be less than 1 mm. A zigzag may have with at least two inner corners. More preferably, the sipe Si has the form of a zigzag with at least three or at least four bends or inner corners.

What has been said above for a sipe Si applies for each sipe of the group G1. A pneumatic tire 100 may comprise further sipes.

The invention claimed is:

1. A tread block arrangement forming a tread configured for forming a rolling contact of the tread against a ground surface, the tread block arrangement comprising:
    tread blocks defining a first side of the tread and a second side of the tread,
    wherein the tread blocks limit at least one longitudinal groove intermediate the first side and the second side of the tread in a transversal direction of the tread block arrangement and that extends in a direction transverse to the transversal direction,
    wherein the tread blocks limit a first number of sipes, wherein a second number of the sipes are transversal sipes, and a third number of the transversal sipes form a group, wherein for each sipe of the group, the tread block arrangement forms a bottom, a first sidewall, a second sidewall, and a first end wall,
    wherein each sipe of the group comprises a second end wall comprising a different average inclination than an average inclination of the first end wall, and the first end wall of the each sipe of the group is configured so that:
        a distance between the first end wall of the each sipe and an outer side of the tread block arrangement is less than a distance between another end of the each sipe and the outer side, wherein the tread block arrangement comprises a first marking defining the outer side, or the first end wall is closer to the outer side than to an opposite other side of the tread block arrangement,
        at least a part of the first end wall of the each sipe has a first surface normal of the each sipe, and
        the first surface normal of the each sipe forms a first minimum angle of the each sipe of at least 20 degrees with the tread, wherein
        a ratio of the second number of sipes to the first number of sipes is at least 75% and
        a ratio of the third number of sipes to the second number of sipes is at least 30%.
2. The tread block arrangement according to the claim 1, wherein
    each transversal sipe extends in a longitudinal direction of the each transversal sipe so that the longitudinal direction of the each transversal sipe is parallel to the transversal direction or
    forms a first angle for the each transversal sipe with the transversal direction, the first angle for the each transversal sipe being at most 45 degrees.
3. The tread block arrangement according to claim 1, wherein a ratio of the second number of sipes to the first number of sipes is at least 90% and/or a ratio of the third number of sipes to the second number of sipes is at least 50%.
4. The tread block arrangement according to claim 1, wherein, for each sipe of the group a second surface normal of the second end wall of the each sipe is in a plane that is parallel to the tread or forms a second minimum angle of at most 15 degrees with the tread, whereby a second angle between the first surface normal of the each sipe and the second surface normal of the each sipe is 10 degrees to 170 degrees.
5. The tread block arrangement according to claim 1, wherein the tread blocks are formed of a material comprising rubber having shore A hardness less than 70 ShA according to ASTM standard D2240.
6. The tread block arrangement according to claim 1, comprising a stud for improving friction.
7. The tread block arrangement according to claim 1, wherein the first end wall of each sipe of the group is planar.
8. The tread block arrangement according to claim 1, wherein each sipe of the group has only two ends.
9. The tread block arrangement according to claim 1, wherein each sipe of the group extends between the first end wall of the each sipe and the second end wall of the each sipe, wherein when viewed from top, the each sipe has a zigzag form with at least two bends or has a zigzag form with at least two inner corners.
10. The tread block arrangement according to claim 1, wherein the first marking defines the outer side, and wherein in use, the outer side is located further away from a centre of a vehicle having the tread block arrangement than an opposite inner side of the tread block arrangement, and/or the tread block arrangement comprises:
    a second marking indicative of the tread band being configured as a winter tire and/or a third marking indicative of the tread band being configured for driving at a speed of at least 106 km/h.
11. The tread block arrangement according to claim 1, wherein a distance between the first end wall of each sipe of the group and a closest edge of a tread block is at least 0.5 mm and/or for each sipe of the group, the first angle is at least 30 degrees.
12. The tread block arrangement of claim 1, wherein the second end wall forms, on average, a smaller angle with a direction of a thickness of the tread block arrangement than an angle with a direction of a thickness of the tread block formed with the first end wall.
13. The tread block arrangement of claim 4, wherein the second angle is from 45 degrees to 160 degrees.
14. A tire comprising:
    a cylindrical part, and
    a tread block arrangement forming a tread of the tire, the tread configured for forming a rolling contact of the tread against a ground surface, the tread block arrangement comprising tread blocks defining a first side of the tread and a second side of the tread, wherein the tread blocks limit at least one longitudinal groove that is left in between the first side and the second side of the tread in a transversal direction of the tread block arrangement and that extends in a direction transverse to the transversal direction, wherein the tread blocks limit a first number of sipes, wherein a second number of the sipes are transversal sipes, and a third number of the transversal sipes form a group, wherein for each sipe of the group, the tread block arrangement forms a bottom, a first sidewall, a second sidewall, and a first end wall, wherein each sipe of the group comprises a second end wall that has a different average inclination than the first end wall, and the first end wall of each sipe of the group is configured so that:
- a distance between the first end wall of the each sipe and an outer side of tread block arrangement is less than a distance between the other end of the each sipe and the outer side, wherein the tread block arrangement comprises a first marking defining the outer side, or the first end wall is closer to the outer side than to an opposite other side of the tread block arrangement,
- at least a part of the first end wall of the each sipe has a first surface normal of the each sipe, and
- the first surface normal of the each sipe forms a first minimum angle of the each sipe of at least 20 degrees with the tread, wherein a ratio of the second number of sipes to the first number of sipes is at least 75%, and a ratio of the third number of sipes to the second number of sipes is at least 30%; and wherein the tread blocks of the tread block arrangement are arranged on the cylindrical part of the tire, wherein:
  - the tread of the tread block arrangement forms a cylindrical tread of the tire, the cylindrical tread of the tire is configured to form a rolling contact against the ground surface, and the longitudinal groove of the tread block arrangement forms a circumferential groove of the tire.

15. The tire of claim 14, wherein each transversal sipe extends in a longitudinal direction of the each transversal sipe so that the longitudinal direction of the each transversal sipe is parallel to the transversal direction or the longitudinal direction of the each transversal sipe forms a first angle with the transversal direction, the first angle for the each transversal sipe being at most 45 degrees.

16. The tire of claim 14, wherein a ratio of the second number of sipes to the first number of sipes is at least 90% and/or a ratio of the third number of sipes to the second number of sipes is at least 50%.

17. The tire of claim 14, wherein, for each sipe of the group a second surface normal of the second end wall of the each sipe is in a plane parallel to the tread or forms a second minimum angle of at most 15 degrees with the tread, whereby a second angle between the first surface normal of the each sipe and the second surface normal of the each sipe is from 10 degrees to 170 degrees.

18. The tire of claim 14, wherein the tread blocks are formed of a material comprising rubber having shore A hardness less than 70 ShA according to ASTM standard D2240.

19. The tire of claim 14, further comprising a stud for improving friction.

20. The tire of claim 14, wherein the first end wall of each sipe of the group is planar.

21. The tire of claim 14, wherein each sipe of the group has only two ends.

22. The tire of claim 14, wherein each sipe of the group extends between the first end wall of the each sipe and the second end wall of the each sipe, wherein when viewed from above, the each sipe has a zigzag form with at least two bends or has a zigzag form with at least two inner corners.

23. The tire of claim 14, further comprising wherein the first marking defines the outer side, wherein in use, the outer side is located further away from a centre of a vehicle having the tread block arrangement than an opposite inner side of the tread block arrangement; and/or comprising a second marking indicative of the tread band being configured as a winter tire; and/or further comprising a third marking indicative of the tread band being configured for driving at a speed of at least 106 km/h.

24. The tire of claim 14, wherein a distance between the first end wall of each sipe of the group and a closest edge of a tread block is at least 0.5 mm and/or for each sipe of the group, the first angle is at least 30 degrees.

25. The tire of claim 14, wherein the second end wall forms, on average, a smaller angle with the radial direction of the tire than an angle with the radial direction of the tire formed with the first end wall.

26. The tire of claim 17, wherein the second angle is from 45 degrees to 160 degrees.

* * * * *